United States Patent [19]

Claus et al.

[11] Patent Number: 4,809,362

[45] Date of Patent: Feb. 28, 1989

[54] FIBER-OPTIC STAR TREE NETWORK

[75] Inventors: Richard O. Claus, Christianburg; Ashok Sankar, Roanoke, both of Va.

[73] Assignee: Center For Innovative Technology, Herndon, Va.

[21] Appl. No.: 25,692

[22] Filed: Mar. 13, 1987

[51] Int. Cl.$^4$ .......................... H04B 9/00; G08B 5/00
[52] U.S. Cl. .................................. 455/607; 455/601; 370/1; 340/825.02
[58] Field of Search ...................... 455/607, 601, 3, 13, 455/606, 612; 370/54, 1, 4; 340/825.02, 825.52; 375/3

[56]  References Cited

U.S. PATENT DOCUMENTS

| | | | |
|---|---|---|---|
| 3,731,002 | 5/1973 | Pierce | 370/88 |
| 3,944,723 | 3/1976 | Fong | 340/825.02 |
| 4,017,149 | 4/1977 | Kao | 350/96 |
| 4,063,220 | 12/1977 | Metcalfe et al. | 340/147 LP |
| 4,290,142 | 9/1981 | Schnee et al. | 455/3 |
| 4,366,565 | 12/1982 | Herskowitz | 370/1 |
| 4,511,208 | 4/1985 | Ozeki et al. | 350/96.16 |
| 4,531,239 | 7/1985 | Usui | 455/607 |
| 4,539,677 | 9/1985 | Lo | 370/85 |
| 4,553,235 | 11/1985 | Svensson | 370/94 |

FOREIGN PATENT DOCUMENTS 0089146  5/1985  Japan .................................. 455/601

OTHER PUBLICATIONS

"The Principles and Performance of HUBNET: A 50 Mbit/s Glass Fiber Local Area Network", by Lee et al, *IEEE Journal on Selected Areas in Communications,* vol. SAC-1, No. 5, Nov. 1983, pp. 711-720.

Ikeman et al.; "High-Speed Network Uses Fiber Optics;" *Electronic Week;* Oct. 22, 1984; pp. 95-100.

*Primary Examiner*—Benedict V. Safourek
*Assistant Examiner*—Andrew J. Telesz, Jr.
*Attorney, Agent, or Firm*—Larson and Taylor

[57] ABSTRACT

A communication network and method implementing a star-tree topology utilizes conventional hardware and the CSMA/CD protocol. The network comprises in one embodiment at least two sets of user devices, in turn comprised of at least two user devices, connected through optical connectors and intelligent hubs to one another. Within each set of devices, the devices themselves are connected together by optical connectors through an optical coupler and an intelligent hub.

The method according to one embodiment involves the steps of assigning unique addresses to each hub and subhub in the network and of assigning a device address to each user device. The device address need only be different from the addresses of the other devices in the family. The messages are sent from any one station through a passive coupler to all the other stations connected thereto. If an exclusive OR situation exists whereby either but not both the subhub of the family is the source subhub or the destination subhub then that subhub copies the message and rebroadcasts the message either to its own family or to its parent.

6 Claims, 4 Drawing Sheets

FIBER-OPTIC STAR TREE NETWORK

FIELD OF THE INVENTION

The present invention relates to a new topological communications network, and in particular relates to a packet-switching fiber optic local area network utilizing the CSMA/CD (Carrier Sense Multiple Access with Collision Detection) protocol.

BACKGROUND OF THE INVENTION

The present invention is a variation of the "HUB-NET" network which itself is a packet switching network. HUBNET is a packet-switching local area network utilizing optical fibers as the transmission medium. This network and the protocols utilized therein are thoroughly described in the literature. For example, see E. Stewart Lee and Peter I.P. Boulton, "The Principles and Performance of HUBNET: A 50 Mbit/s Glass Fiber Local Area Network," Vol. Sac/1 *IEEE J. Selected Areas In Communications* (No. 5, Nov. 1983), incorporated in its entirety herein by reference. The CMSA/CD protocol is described in the Metcalfe et al U.S. Pat. No. 4,063,220 and the Lo U.S. Pat. No. 4,539,677, both incorporated herein by reference. The CSMA/CD protocol sets the operating conditions and data format for a multiuser common bus.

Figure 1:
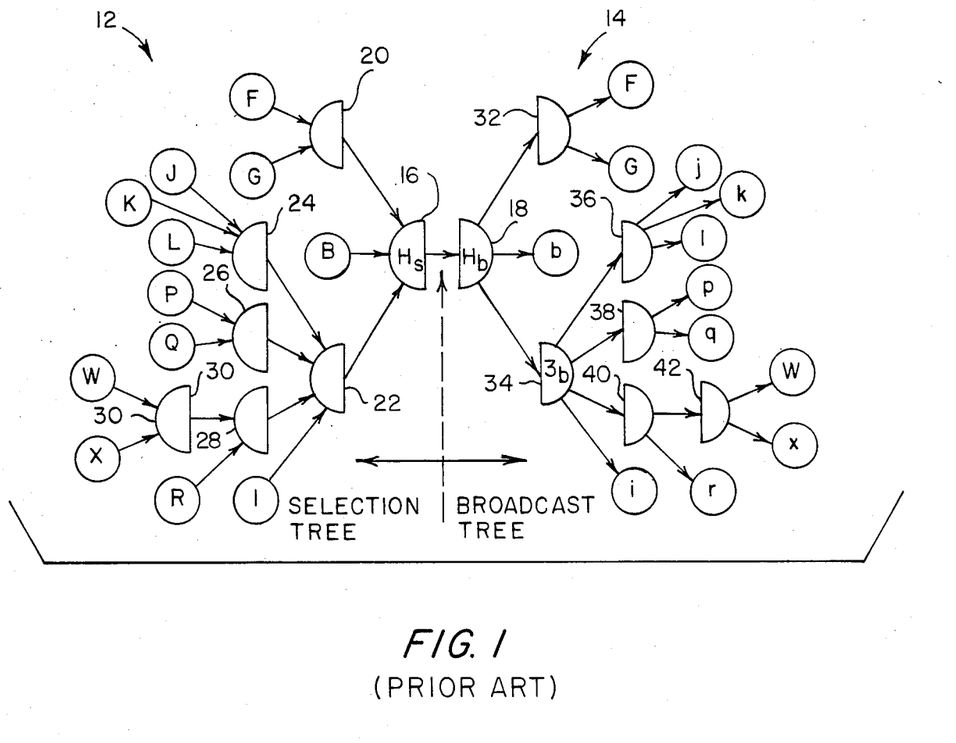
FIG. 1 is a schematic illustration of the conventional, prior art, HUBNET Communication Network.

The network structure of HUBNET is a pair of trees rooted at a central hub, one tree being used for selection and the other tree being used for broadcast. Intelligent devices called subhubs form the internal nodes in the tree and conventional devices called Network Access Controllers (NACs) in the leaves of the tree provide the interface for communication between the terminals attached to them and to the network. The trees are matching in every respect and the HUBNET network is depicted in FIG. 1.

The communication medium in HUBNET is twin-fiber, one fiber being used for transmission and the other fiber being used for reception. While the HUBNET proposal utilizes selection nodes and broadcast nodes that are constructed together, the two nodes remain almost completely independent. Furthermore, the internal nodes, or subhubs, in each tree are technically similar to the main hub. All communications between devices must first travel up the selection tree to the selection hub, then must cross over to the broadcast hub; and finally must travel to the destination device through the broadcast tree.

Figure 2:
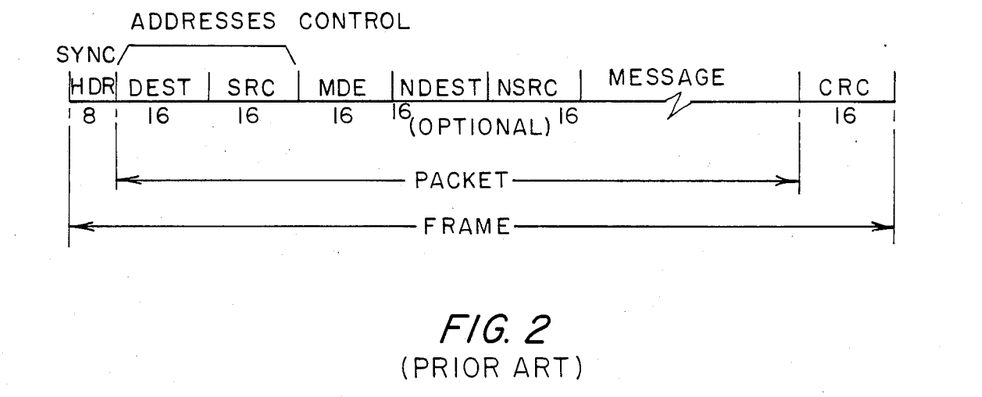
FIG. 2 is a time diagram depicting the conventional layout of information within a message frame.

A packet of data to be transmitted is sent in a frame having a predetermined format. The protocol is described in the Lee and Boulton article and for the purpose of completeness a packet is depicted in FIG. 2. When a device in the HUBNET network transmits, the selection side of the network takes over and the frame is sent all the way to the root of the selection tree to the main hub. At the main hub from the selection side the frame is linked to the central hub of the broadcast tree and then, the frame is broadcast to all of the NAC receivers along the branches of the broadcast tree, including the station which transmitted the message. Thus, this broadcast also serves as an echo signal to the source NAC. However, if at any point on the selection side, a subhub is already committed to a previous frame of data, the new incoming frame is ignored. In addition, the source, not bearing the echo after a fixed time, is programmed to repeat the transmission of the frame. Thus, an NAC must wait until an echo signal is received at its reception side before it can transmit a new packet of information. This leaves much room for large transmission delays.

Although the HUBNET is one of the best known and best documented fiber-optic networks, other structures have been used and are known. For example, the ETHERNET network is a bit-serial receiver-transmitter network that is continuously connected to all communicating devices along a single path that has terminators at each end. The ETHERNET network is described in the Metcalfe et al U.S. Pat. No. 4,063,220 and in the article by that inventor referenced in the Lee and Boulton article, supra. However, the ETHERNET system has been criticized as not being suitable for use with glass fiber as a communication medium primarily because of the large power drop that must be accommodated in a glass fiber network.

Another common topology is the ring or closed loop topology. Examples of this topology in an optical fiber network are disclosed in the Kao U.S. Pat. No. 4,017,149 and the Herskowitz U.S. Pat. No. 4,366,565, both incorporated herein by reference. This topology has been used for fiber optical bus communication systems. The disadvantage, however, of this topology is that only one station can talk at a time, thereby tieing up communications between other stations to either the communicating station or to another station not in the "conversation." Furthermore, this network is somewhat limited in the number of devices that can be attached.

Another well known topology is the star network. In a star, all devices must communicate directly with a central site. An example of a star network is the FIBER-NET network in which up to 19 devices are connected by optical fibers to a central hub. Another example is depicted in the Svensson U.S. Pat. No. 4,553,235, and the Usui U.S. Pat. No. 4,531,239, both incorporated herein by reference. The star network has the disadvantage of requiring a large amount of extra cabling and the tangling of the cabling at the central site. Furthermore, damage to the central hub will completely deactivate the entire network.

All network communications systems that utilize optics in the transmission of the messages are comprised also of a plurality of optical connecting means, such as optical fibers, optical couplers, electro-optical converters, and optical-electrical converters. All of this optical hardware is conventional and commercially available. It is also described in the literature, such as in the Ozeki et al U.S. Pat. No. 4,511,208, incorporated herein by reference and the previously mentioned Herskowitz patent. Although the Ozeki et al patent is primarily directed to optical couplers, it also discloses a plurality of fiber optic communication networks, such as the T-coupler network, the star-coupler network, the plural star coupler network that has a plurality of sub-star couplers directly coupled to one main star coupler and the plural star-T coupled network. Generally, most conventional optical communication networks utilize two fibers in the transmission lines, one fiber for communications in each direction. However, much work is currently being done on utilizing a single optical fiber and eventually a single optical fiber transmission line may become common.

Local area networks using multiple transmission techniques must account for the possibility of a collision of data, that is two different stations sending data simultaneously. The CSMA/CD protocol is a common protocol used for dealing with this possibility. Under the protocol, a station ready to send a prepared data frame first checks the network bus for an idle condition and when detected immediately sends the message. The stations simultaneously listen to the bus and compare the data being transmitted with the data received. When a collision or interference condition is detected, the station aborts the transmission. Aborted transmissions are rescheduled by the stations after "backoff" delay intervals that are randomly selected, thereby lessening the likelihood of repeated collisions by the same competing stations.

All of these prior art networks have disadvantages or features that do not make them compatible for use in a fiber-optic network. It is desirable to have a network that not only permits future expansion, but also allows local communications so that the entire network is not tied up, is relatively inexpensive, can account for the power drops in the transmission of a fiber optic transmission line, and is redundant enough so that a single casualty does not disable the entire network.

SUMMARY OF THE INVENTION

The present invention provides a network that overcomes these and many of the other problems of the prior art. The network according to the present invention provides a combined star and tree network utilizing a plurality of interconnected, but independent hubs to interconnect the Network Access Controllers (NACs) of the user devices. Such a network offers the possibility of simultaneous traffic between the NACs in the independent sections of the network, while still allowing access to the entire network by each NAC.

The present network also utilizes well known devices and components and implements the well recognized CSMA/CD protocol. On the one hand, the present network can be implemented as a small network, while on the other hand it provides for future expansion to eventually include a relatively large number of users.

As with most local area networks, the present network is expected to operate under relatively light loads most of the time. However, a network in accordance with the present invention can still utilize buffer areas in the hubs that are large enough to handle heavy loads.

A communication network according to one embodiment of the present invention comprises a plurality of passive optical couplers for substantially simultaneously retransmitting along an optical connector means, that can comprise a fiber optic connector a message sent by one station connected to the coupler to all of the other stations connected to the coupler. The network also comprises a plurality of intelligent hubs which are connected together in a star at yet another passive optical coupler.

In a specific embodiment of the present invention, the communication network connects together in a star-tree topology at least two sets of user devices for transmitting messages between the devices. Each set of user devices includes at least two such devices and each user device further includes a Network Access Controller (NAC) for coupling the device to the network. In this particular embodiment, the network comprises a first level passive optical coupler and at least two intelligent hubs. A first level optical connector means is individual to each of the hubs and connects that hub to the first level coupler. The first level optical connector means is for transmitting messages between the connected hubs. The first level coupler provides a transmitted signal from any one or more of the hubs that is received over the connecting means substantially simultaneously to each of the connected hubs. The network further comprises a plurality of second level passive optical couplers, each second level coupler being individual to each one of the hubs, and further first level optical connector means individual to each second level coupler for connecting the second level coupler to the corresponding one of the hubs and for transmitting messages therebetween. Finally, the network includes a set of second level optical connector means individual to and connected to each one of the second level couplers and connectable, in turn, to an NAC of a device for transmitting messages there between. Each one of the second level couplers, when connected, provide a transmitted message from any one or more devices substantially simultaneously to all of the devices that are connected to that second level coupler.

The present invention also comprises a method of communicating between a plurality of stations that are connected together in a star-tree topology. The method, according to a specific embodiment, is utilized in a network in which any station can be a source or a destination of the message being transmitted and the network comprises at least a first and second family of stations wherein each station within a family has a different address and all stations within a family are connected together with optical connecting means and a star configuration at a central passive optical coupler. The network further includes a first and second parent hub, each parent hub having a unique address and said first and second hubs being respectively connected to said first and second optical couplers and further being connected to each other with an optical connecting means in a star configuration at a common main passive optical coupler. The particular method according to this embodiment comprises assigning a first and second part destination address to a message to be sent wherein the first destination part contains the address of the destination hub and the second destination part contains the address of the destination station that is connected to the destination hub. The method also includes assigning a first and second part source address to the message to be sent wherein the first source part contains the address of the parent hub and the second source part contains the address of the source station within that family connected to the source parent hub. The method further includes transmitting the message from the source station to the parent hub and to all stations connected to the parent hub, and copying the message by the parent hub only if the message destination is a station outside of the family of the transmitting stations. If the parent hub copies the message, then the parent hub retransmits the message outside of the source station to at least one other hub to which it is connected. A message retransmitted by a parent hub is further copied at a receiving hub only if the message destination is a station inside the family of stations of that hub. Such retransmitted message is then retransmitted by the copying hub to its family of stations. Finally, the transmitted message is copied by the destination station.

The apparatus and method according to the present invention permit a plurality of simultaneous communications to be carried on by different families, the families being insulated from each other by hubs that transmit messages in an exclusive-or circumstance where only one of the source and destination stations are within the family. According to the present invention, the network provides the potential for a large system configuration and design which can be specially configured and optimized in certain patterns as an entire network and as different pattern within the same network, and which can further be expanded as the necessity arises. Furthermore, the system does not suffer from a catastrophic disaster upon the damage to any hub or station, such as would result in a pure star configuration or a ring configuration.

Other objects and advantages of the present invention are set forth in, or are apparent from, the detailed description of the present preferred embodiment and the accompanying drawings.

DETAILED DESCRIPTION OF THE PREFERRED EMBODIMENT

In the figures, like numerals are used to represent like elements throughout the several views. All of the hardware utilized in the present invention is conventional and is fully described in the literature. In certain instances, however, in both the description of the prior art section and in this section of the application, exemplary references will be made to illustrate specific embodiments of specific hardware. However, these references are only being made for the sake of completeness, and it is within the knowledge of those skilled in the art to select conventional hardware, to assemble the hardware into the network as taught herein, and finally to make the necessary hardware and software interfaces in order to implement the network. Similarly, most of the network software would be obvious to those of ordinary skill in the art, and further would be dependent to some degree at least on the specific configuration in a specific embodiment of the present invention.

With reference now to FIG. 1, the conventional HUBNET network 10 is depicted. HUBNET 10 is comprised of a selection tree network 12 and a broadcast tree network 14, each network respectively tied to a central hub depicted as selection hub 16 and broadcast hub 18. The literature occasionally refers to hubs 16 and 18 as root hubs. Each tree network is comprised of internal nodes or hubs, which in the network of FIG. 1 is set out in three tiers, layers or levels below the first level comprised of hubs 16 and 18. Thus, in selection tree network 12, there are subhubs 20 and 22 connected to hub 14, in a second level; subhubs 24, 26 and 28 connected to subhub 22 in a third level; and subhub 30 connected to subhub 28 in a fourth level. In addition, there are a plurality of stations connected to the various hubs and subhubs in the aforedescribed four levels together with a fifth level of stations connected to subhub 30. These stations are all labeled with capital letters.

On the broadcast side of tree network 14, there is a mirror image of the network on the selection side. Thus, connected to broadcast hub 18 are subhubs 32 and 34 in a second level; subhubs 36, 38 and 40 connected to subhub 34 in a third level; and subhub 42 connected to subhub 40 in a fourth level. The stations receiving the broadcast and which are connected to their respective hub and subhubs are denoted by lower case letter which correspond exactly to the capital letters designating their companion selection stations. The subhubs in each of tree networks 12 and 14 are technically similar to hubs 16 and 18. Although significant hardware savings can be achieved by having the selection hubs and broadcast hubs and subhubs being constructed in a mirror network, each hub and subhub remains almost completely independent.

The Lee and Bolton Article, Supra, fully describes the transmission of messages throughout FIG. 1. However, the messages are first divided by the transmitting station into packets and each packet is further enveloped into a message frame. Each of the stations are connected to the network by intelligent devices called Network Access Controllers (NAC's). Some terminology labels the NAC's as leaves connected to the branches of the network tree.

A station transmits a message frame through its corresponding NAC to the selection side of selection tree network 12. If the network is quiescent, the hub selects the frame and sends it to the yet-more-central hub to which its selection side is connected. Eventually, the message frame reaches the selection hub 16 and again assuming no interference is immediately sent from that root to the broadcast hub 18 or root of the broadcast tree network 14. From broadcast hub 18, the message follows through the broadcast tree network 14 until it reaches the hub and station connected to that hub. Any message frame entering the root of the broadcast tree is sent up the entire tree with each reception station reading the address and ignoring the message if it is not destined for it. The destination NAC reads the message into its reception buffer and generates an echo detection signal in its corresponding source NAC. The detection signal is thus transmitted from the source NAC of the message destination station through source tree network 12 and broadcast tree network 14 back to the station initiating the message.

A conventional message frame usable on the HUBNET, and also usable in the present invention, is constructed according to the time diagram depicted in FIG. 2. Each message frame comprises a message packet that is prefaced by a frame header and followed by a frame CRC trailer, the header being used to alert the network that a message is being transmitted and the trailer being used s check sums to determine whether there was a transmission error. The message packet itself is comprised of at least four parts and in the embodiment depicted in FIG. 2 is comprised of an additional two optional parts. The first two parts comprise the destination and the source addresses and are followed by the control word. The two optional parts are the network destination address and the network source address. Finally, the message data words are contained. In the protocol of the message frame depicted in FIG. 2, the length of network destination and source addresses and the message data are 16-bit words.

A communications network 100 in accordance with the present invention will now be described with reference to FIGS. 3 and 4. As in the HUBNET network 10, network 100 is organized into a plurality of hiearchal levels which form a tree configuration. Branching or overlapping each level are a plurality of devices interconnected to form a star configuration. Thus, as explained more fully below, the present network is a combination star-tree configuration.

Figure 3:
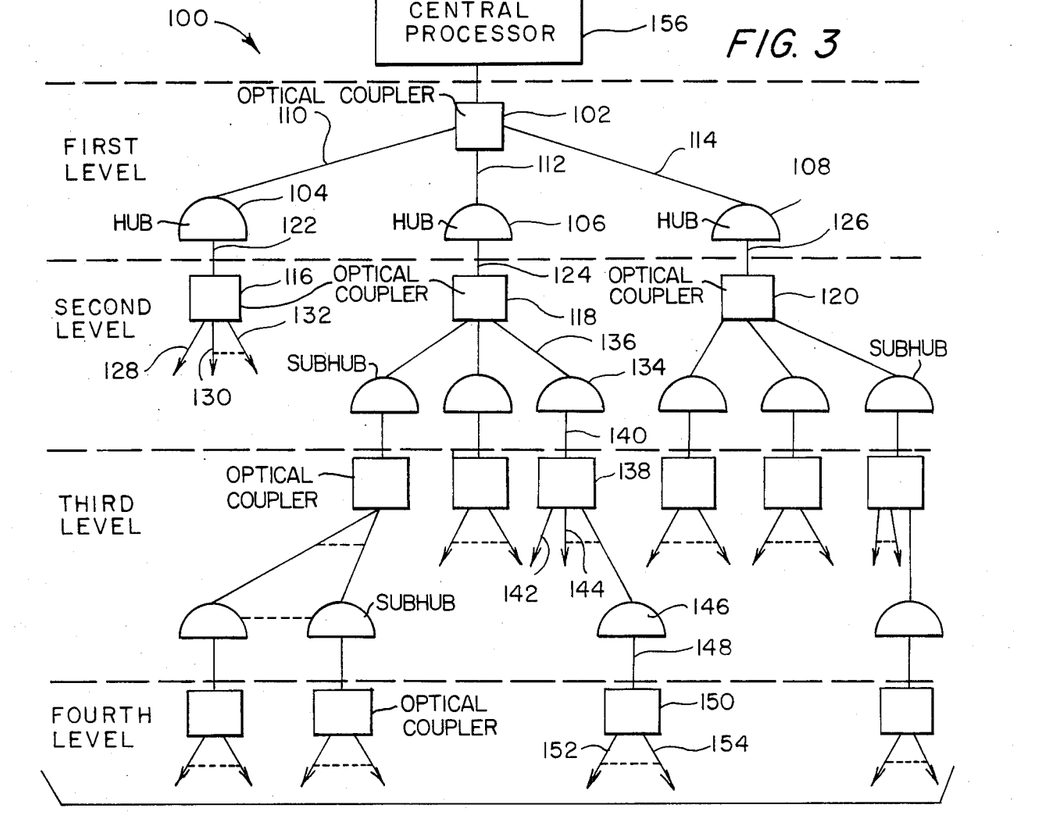
FIG. 3 is a schematic illustration of a star-tree network in accordance with the present invention.
Figure 4:
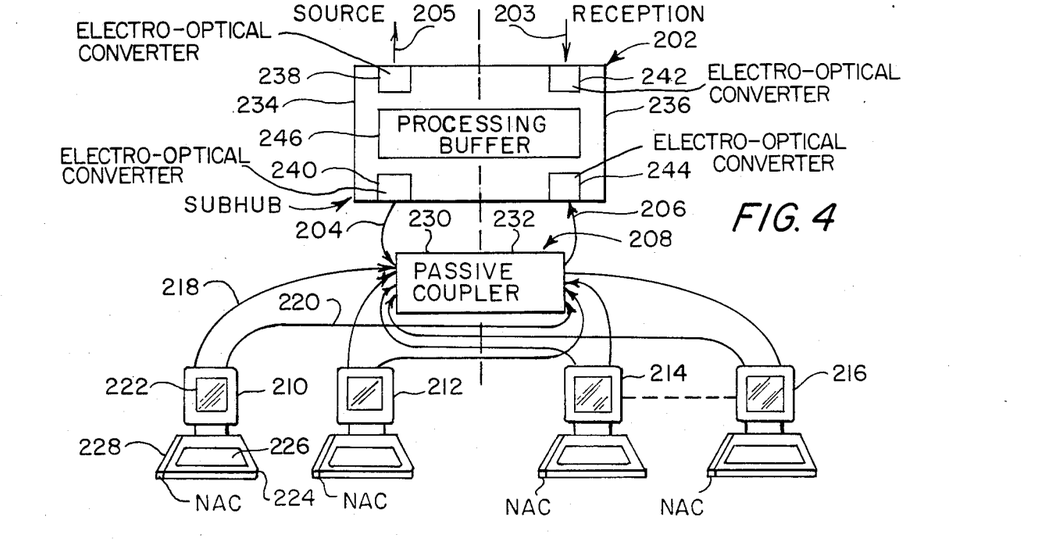
FIG. 4 is a schematic block diagram of a portion of the network according to the present invention.

In the diagram of FIG. 3, three levels of the star-tree network are depicted. The first level is comprised of a main or central optical coupler 102 that is optically connected to three hubs 104, 106 and 108 with three respective optical connectors 110, 112 and 114. The connections to coupler 102 form the highest level star in the network. The second level begins with optical couplers 116, 118, and 120 that are individually connected to their respective hub with a further first level optical connector 122, 124, and 126, respectively. Thus, a major variation between the present invention and the aforedescribed HUBNET network 10 exists at the physical layer itself wherein the present invention utilizes interaction between any parent on one level and its children in the network on the next level through passive optical couplers. Another significant difference between the present network 100 and HUBNET network 10, described in greater detail hereinbelow, is that a hub does not automatically retransmit every signal that it receives, but rather makes an intelligent decision about rebroadcasting the message based on information contained in the message itself.

Although user devices can be connected to any particular coupler in the network, user devices are only depicted in the first level in FIG. 3 as being connected to coupler 116. These user devices are represented in FIG. 3 as arrows, and thus three user devices, 128, 130 and 132 are depicted as being connected to coupler 116. The number of devices connectable in a star configuration to coupler 116 (or any coupler) is dependent more upon the state of the art and the transmission loss of the optical signal than from the design of the present network. Similarly, the present network contemplates the attachment of both user devices and further subhubs to the same optical coupler. This is depicted in the third level where a subhub 134 is connected to second level optical coupler 118 by an optical connector 136, on the parent side of subhub 134, and to a third level optical coupler 138 by an optical connector 140 on its family side. Connected to optical coupler 138 are both user devices 142 and 144 as well as a child subhub 146. To complete the description of the family of subhub 134, connected by an optical connector 148 to third level subhub 146 is a fourth level optical coupler 150. Connected in turn to fourth level optical coupler 150 are a plurality of user devices indicated by user devices 152 and 154.

Also connected to optical coupler 102 is a master central processor 156. Central processor 156 provides a maintenance function for the network and constantly monitors the operability of each hub and subhub. Should central processor 156 detect that a particular hub or subhub has suffered a breakdown, it communicates that information to the other hubs and subhubs. The operation of and function served by central processor 156 is conventional and well known to those skilled in the art.

As mentioned above, all of the components utilized in network 100 are conventional and are well known to those skilled in the art. These components will be discussed in greater detail with respect to FIG. 4, which depicts a typical branch of network 100. In particular, FIG. 4 depicts a subhub 202 connected to its parent by a source or outgoing optical connector 203 and a reception or incoming optical connector 205 and connected to its family by a source and reception optical connectors 204 and 206, respectively and a passive coupler 208. A plurality of user devices in the family of subhub 202 is depicted by four terminals 210, 212, 214 and 216. Each terminal is connected to coupler 208 with a source optical connector, such as connector 218, and a reception optical connector, such as optical connector 220. A typical terminal includes a video display 222, a computer 224 and a keyboard 226. One of the boards plugged into computer 224 is a conventional Network Access Controller (NAC) board 228.

The optical connectors in network 100, such as connectors 204, 206, 218 and 220, represent a dual-fiber communication path and can be conventional optical fibers. While the communication paths are represented by dual fibers, it would be obvious to those skilled in the art that they could also be represented by bidirectional fibers.

Each NAC 228 includes conventional electronics as well as an electro-optical converter connected between the other electronics and the source connecter 218 and an optical-electrical converter connected between the other electronics and reception optical connector 220. Furthermore, each NAC 228 includes a data buffer memory divided into a selection buffer memory and a broadcast buffer memory. The selection buffer memory is utilized to queue up the incoming data that is received from the source optical-electrical converter. The broadcast buffer memory is utilized to queue up the outgoing data from the NAC.

Passive coupler 208 is divided into a source side 230 and a reception side 232. Source optical connectors 204 and 218, respectively from the upper subhub 202 and from the lower user devices, such as user device 228, are connected together and a signal is passed from any one over to the reception side 232. At reception side 232, the received optical signal is automatically transmitted over each optical connector connected thereto. Thus, a signal is automatically provided over source optical connector 220 to each user device, including the device sending the message, and over source optical connector 206 to subhub 202.

All of the subhubs in the network, such as subhub 202, are substantially identical to each other and also to hubs 104, 106 and 108. This means that costs can be saved by having duplicates of both hardware and software manufactured and then determining only upon installation the particular role that the hub or subhub will play. The only material difference between the hubs and subhub is the information stored in the memory thereof. Each hub or subhub stores the address of its entire immediate family of children, whether the child is a user device such as user devices 142 and 144, or another subhub, such as subhub 146 (FIG. 3). In addition each hub or subhub stores the address of all subhubs that are its grandchildren, great-grandchildren, etc, but not the address of the user devices below the immediate family (e.g. grandchildren or great-grandchildren).

Subhub 202, like NAC 228 has electro-optical converters and optical-electrical converters. However, subhub 202 has two electro-optical converters 238 and 240 on its source side 234 and two optical-electrical converters 242 and 244 on its reception part 236. Electro-optical converters are typically computer controlled LED's (Light Emitting Diodes) and lasers that emit coded pulsed signals into one end of a fiber optic connector. Conversely, the conventional optical-electrical converter can simply be a PIN-diode, a photodiode or a phototransistor connected in a conventional detector circuit.

Subhub 202 also comprises a processing and storage buffer memory 246. Buffer memory 246 is divided into at least three major parts, one part for the microprocessor control instructions and associated memory, one part as a selection buffer for receiving and queueing up the received incoming message, and one part as a broadcast buffer which receives messages from the selection buffer when that message is to be rebroadcast and from the microprocessor of the subhub itself when the subhub originates a message. The intelligence in the subhub also determines whether the outgoing message is to be transmitted to the parent side of the subhub or to the family or child side of the subhub.

Network 100 as thus described maintains a basic tree structure having a plurality of levels, each level comprised of a passive optical coupler and a plurality of intelligent components connected thereto, whether those components be a hub, subhub, or user device, or any combination thereof. Because each component in network 100 is computer controlled (preferably microprocessor controlled) with its own intelligence, the selection and broadcast sides of the tree are implemented at each intermediate node and subnode level. This is in distinction to the implementation at only the root level in the HUBNET network 10.

As mentioned above, the addressing format utilized with network 100 is quite different from the one implemented in HUBNET network 10. In the present invention, the address field is still a 16-bit field. Each subhub is uniquely identified in the first or most significant 8 bits and the second or least significant 8 bits identify the particular source or destination station. Every subhub and hub in the network stores the address fields of all its immediate children and of all subhubs connected to it.

Figure 5:
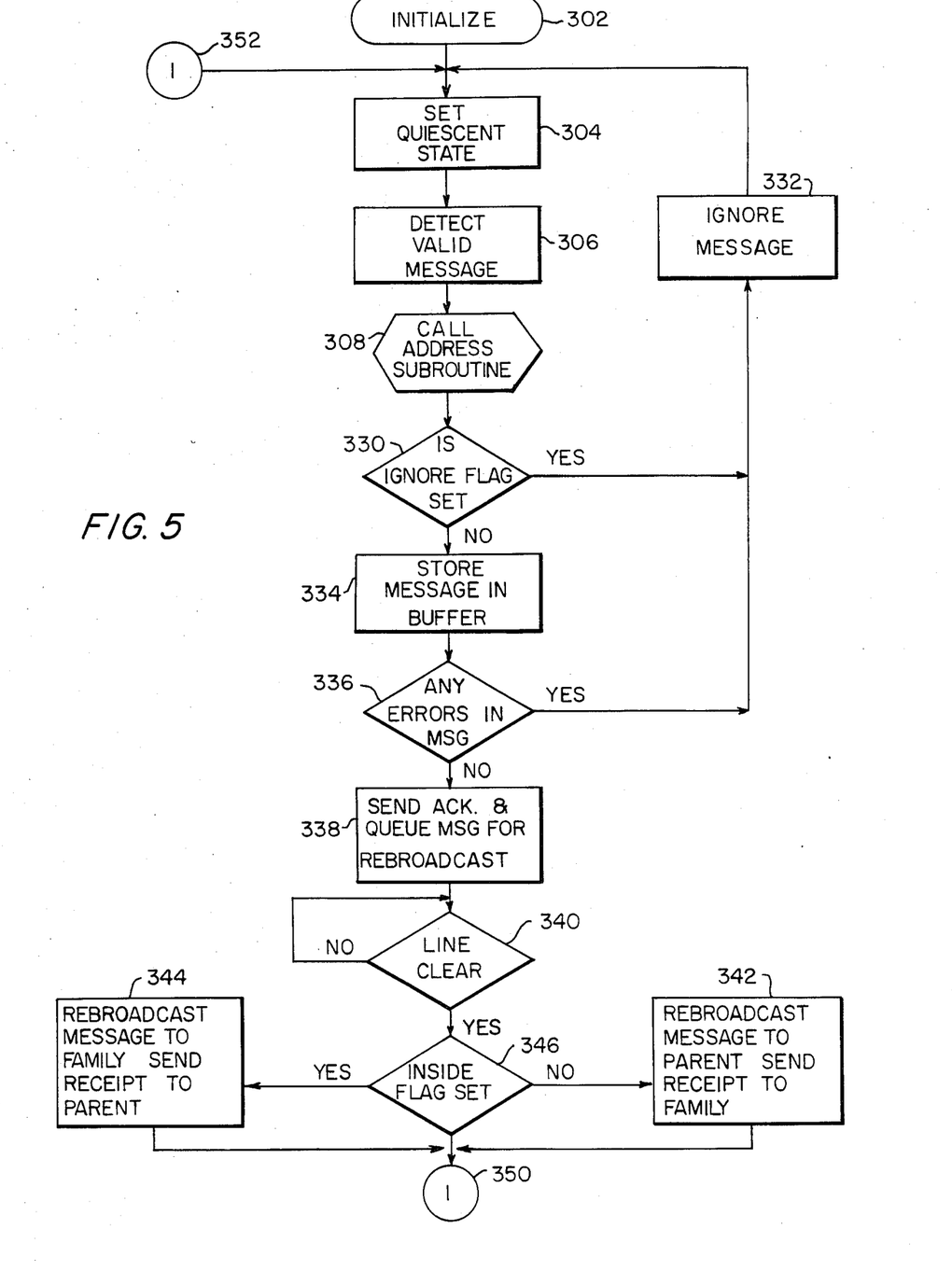
FIG. 5 is a schematic flow diagram of the receiving software for a hub or subhub.
Figure 6:
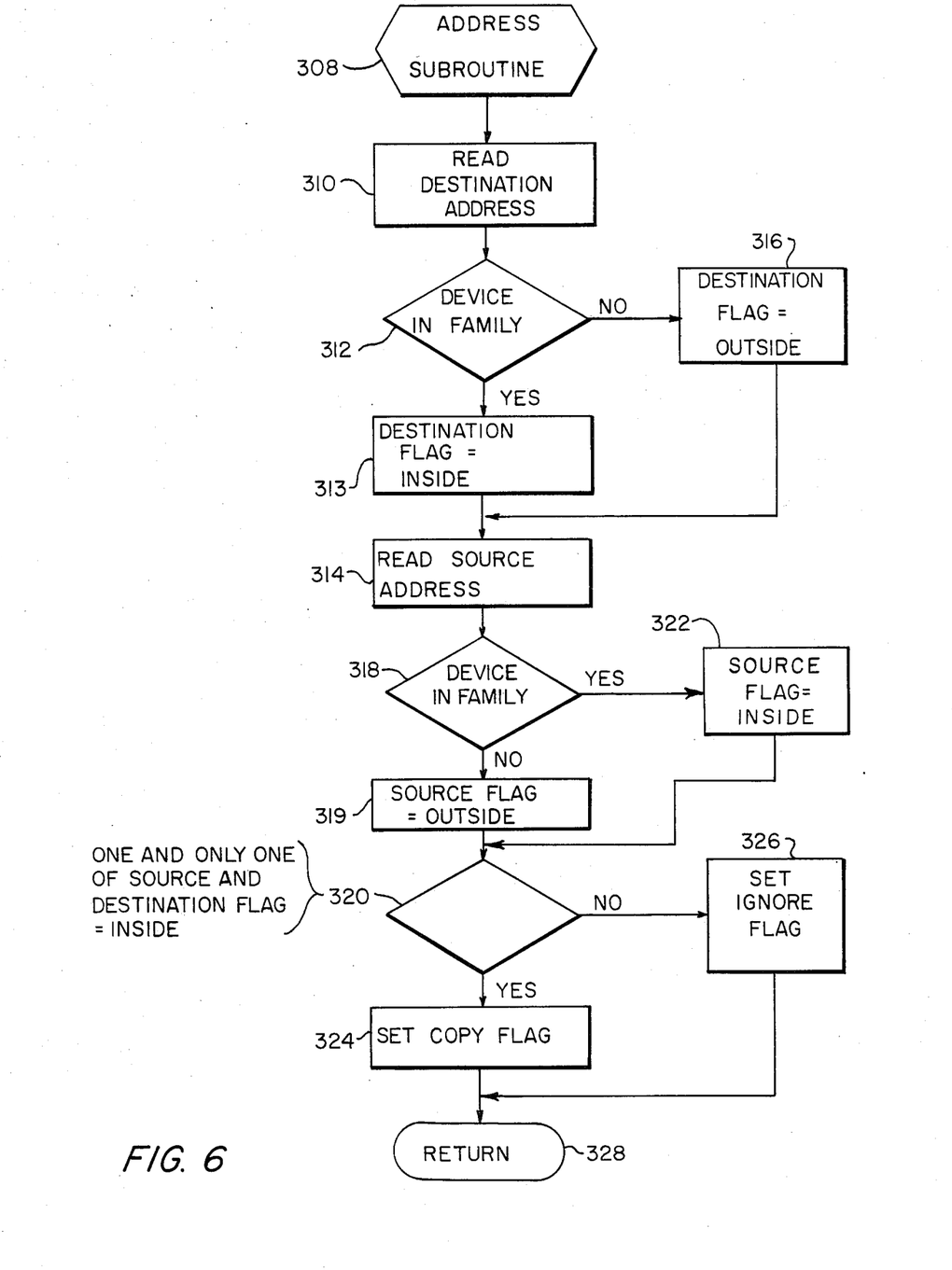
FIG. 6 is a schematic flow chart of the address subroutine utilized in FIG. 5.

With reference now to FIGS. 5 and 6, the operation of the present invention in an illustrative broadcasting example will be described for a subhub. On a power-up or restart, the system is initialized as indicated in a terminal oval 302. Typically, the initialization process includes zeroing all of the buffer memory, loading the program stored in non-volatile memory, and making conventional system checks. From terminal oval 302, the software proceeds to a processing box where the quiescent state is set. Again, this is a conventional process and simply involves readying the subhub for reception of a signal, "listening" to the network, determining if signals on the channel represent a valid message, and determining if a collision of two or more messages has taken place. As soon as a valid message is detected, as indicated in processing box 306, the initial part of the message is stored in the source or reception buffer.

The program then branches to the address subroutine in a call polygon 308. The address subroutine is depicted in FIG. 6 wherein when called, the program initially reads the destination address in the message frame header, as indicated in processing box 310. More particularly, a first or most significant 8 bits of the address are read and compared with the address of the receiving subhub, as indicated in decision diamond 312. If the destination subhub address does not match the addresses of its family stored in its buffer, then obviously the destination device is outside the family of that subhub. If the address matches, the program proceeds to set the Destination Flag equal to "INSIDE", as indicated in processing box 313, and then reads the source address, as indicated in processing box 314. On the other hand, if the address is not the same, the program branches to processing box 316 where the program sets the Destination Flag equal to "OUTSIDE". The program than branches back to processing box 314.

From processing box 314, the program proceeds to decide whether the device is in the family as indicated in decision diamond 318. This determination is made by simply comparing the leading or most significant 8 bits in the source address with the addresses in its buffer. If there is no match, the program proceeds to set the Source Flag equal to "OUTSIDE," as indicated in processing box 318, and then proceeds to a flag checking decision diamond 320. If there is a match, then obviously the source is in the family of that receiving subhub and the program sets the Source Flag to "INSIDE," as indicated in processing box 322. From processing box 322, the program branches back to decision diamond 320. In decision diamond 320, the program determined whether one and only one of the Source and Destination Flags equal "INSIDE." Obviously, the alternative determination could be made that one and only one of the Source and Destination Flags equal "OUTSIDE." Thus, this is essentially an "exclusive-OR" determination. If only one of the flags is set, the program proceeds to set the "copy flag" as indicated in processing box 324, otherwise the program branches to set an "ignore flag" as indicated in processing box 326. From either processing box 324 or 326, the program proceeds to return to the main program, as indicated by the return terminal 328.

Returning to FIG. 5, when the program returns to the main routine, the determination is made whether the "ignore flag" has been set as indicated in decision diamond 330. If the "ignore flag" has been set, the program ignores the message and clears the reception buffer as indicated in processing box 332, from which the program returns to processing box 304 and the quiescent state is set again.

On the other hand, if the "ignore flag" has not been set, then the subhub must copy the entire message and store it in its reception buffer, as indicated in processing box 334. Once the message has been stored, the program checks to see whether there are any errors in the message using conventional error checking routines, as indicated in decision diamond 336. In one scheme usable in the present invention, the program compares the data in the CRC field (FIG. 2) with a calculation of the data contained in the rest of the packet. In certain message schemes and protocol, the CRC record also contains an error correction code which can be utilized by the computer to correct some errors and to regenerate the received data. Again, these techniques are well known to those skilled in the art. If an error is detected in the message, the program again branches to processing box 332 where the message is ignored and the program returns to set the quiescent state as indicated in processing box 304. On the other hand, if no errors, or conversely, if an error has been detected and corrected, the program proceeds to send an acknowledge message as indicated in processing box 338. In addition to sending an acknowledgement message, the program queues the received message in the broadcast buffer for rebroadcasting. Once the message has been readied for rebroadcast, the program listens to the broadcast line to determine whether the line is clear, as indicated in decision diamond 340. If the line is not clear, the program continues to cycle until the line is clear. Once the line has been determined to be clear, the program determines whether to rebroadcast the message to the parent as indicated in processing box 342 or to the family as indicated in processing box 344 by determining whether the "inside flag" has been set for one and only one of the Source and Destination Flags, as indicated in decision diamond 346. The message is then rebroadcasted in the appropriate channel and a receipt of the message is broadcasted in the other channel. From processing boxes 342 and 344, the program returns to set the quiescent state as indicated by terminals 350 and 352.

Thus, it can be seen that every device in network 100 must contend for the channel with equal priority in its respective family or section. For a hub or subhub, the intelligence in the device together with information in the message makes it possible to determine whether the message is to be rebroadcasted and if so wheter it is to be rebroadcasted to a subhub or hub in a higher level or to a subhub or device in a lower level. With the use of the present addressing format and the isolation of the different families, it is apparent that a device does not have to rebroadcast a message received into the same channel as the source device or that every hub in the network has to receive and rebroadcast the message as in the HUBNET network 10. However, the present invention does utilize, in one aspect thereof, the use of a reception or acknowledgement signal in spite of the fact that the broadcasting terminal automatically gets an echo signal back from the coupler within its family. The acknowledgement signal, which is sent by every hub in the path and also by the destination station, avoids a misleading assumption that proper reception by the ultimate destination device has taken place. Furthermore, the receipt of the acknowledgement signal also advises the source station that the message has been received without uncorrectable error.

Ordinarily, most communication networks such as network 100 are expected to operate under very light loads most of the time, but the buffer areas in the respective hubs and user devices are large enough to handle heavy loads. Typical transmission rates under the CSMA/CD protocol are 10 megabytes per second and a typical contention for the network by any device is usually in the microsecond or millisecond range. Therefore, for example, assuming a communication were to be made by user device 152 to user device 128 (FIG. 3), the time between the sending of the first message frame until the receipt back of an acknowledgement signal would still be in the millisecond range assuming a normal system load.

When a device contends for a channel, as mentioned above, it first listens to determine if the channel is busy. According to the CSMA/CD protocol, if the channel is busy or a collision is detected, the contending device refrains from broadcasting for a random interval of time before contending again. Similarly, any other devices desiring to use the channel will hear the collision and will back off a random and most probably different interval of time. Similarly, according to the protocol, a station not receiving an acknowledgment signal will automatically retransmit the message after a predetermined period of time. Furthermore, if after a limited, albeit relatively large, number of retransmissions an acknowledgment signal is still not received, the transmitting station sends an appropriate message to central processor 156 indicating the failure to receive an acknowledgment signal and the probable failure of the node involved.

One of the advantages of the present invention, as should be apparent from the above, is realized during the failure of any one node. If the failure is in a subhub or hub, then communications are only prevented outside the family, but individual members or siblings within the family can still communicate with one another through the corresponding passive optical coupler. If the failure occurs at the coupler, only the particular family is out-of-commission and any other family trying to communicate with it can still send the out-of-commission report to central processor 156.

Referring again to FIG. 3, two examples will illustrate the operation of the network. First, assume that user device 152 desires to communicate with user device 154. In that situation, user device 152 broadcasts its message frames through its corresponding NAC up to optical coupler 150. Optical coupler 150 passively retransmits the message not only back to user device 152, but also to user device 154 and subhub 146. Subhub 146 will read the destination address and the source address and find that its unique subhub address is included in both, and therefore will ignore the message. Thus, the message is never rebroadcasted and never leaves the immediate family. Consequently, another family, such as that family attached to subhub 104, can carry on a simultaneous conversation without any interference. When user device 154 receives the message, it will search the destination address and identify itself. Then, if there are not uncorrectable errors, user device 154 will send an acknowledgment message back through optical coupler 150 to user device 152. Again, subhub 146 will ignore the transmission.

The second example involves a communication from user device 152 to user device 128. When the channel is clear, user device 152 transmits its message frame to optical coupler 150. The message is ignored by all the siblings of devices 152, but is copied by subhub 146 because the destination address is for a subhub other than itself and the source address contains its own address. Subsequently, subhub 146 sends an acknowledgement or receipt signal back to user device 152, thus releasing user device 152 for other duties. Therefore, user device 152 is not tied up waiting for an acknowledgement from a remote node. This is an implementation of the well known store-and-forward communications scheme. This process is repeated until the intended destination device receives the message. Subhub 146 also rebroadcasts the message to optical coupler 138 in the third level when the channel is clear. Once again, the user devices also coupled to optical coupler 138 will ignore the message because they are not within the destination address, but subhub 134 will copy the message. In a like manner, the message travels through optical coupler 118 to hub 106 and from there through main coupler 102 to hub 104 and hub 108. Hub 108 will ignore the message because although it is not listed as being the subhub in the family of the source device, it is also not listed as being the subhub in the family of the destination device. Again, the exclusive OR situation is not met. However, subhub 104 does copy the signal and, when the channel is clear, broadcasts the signal through optical coupler 116 to user device 128. User device, being listed in the destination address copies the message, but the message is ignored by user devices 130 and 132. User device 128 then sends an acknowledgment message (as of course do the other subhubs in the path) back to source user device 152.

The advantage of the present invention is thus evident in that a device in network 100 need not get tied into the network with one frame waiting for an echo or an acknowledgment from a remote user device. Another advantage is that the sections are mutually exclusive and thus simultaneous communications are possible.

The present invention has been described with respect to a specific network design and method of communication. However, still further modifications would be evident to those of ordinary skill in the art.

We claim:

1. A method of transmitting messages between at least two of a plurality of stations connected together in a fiber optic star-tree communications network wherein, any station can be a source or a destination of the message being transmitted, said network comprising at least a first and a second family of stations, all stations within a family having different addresses, and wherein said first family of stations are connected together and said second family of stations are connected together, respectively, with optical connecting means in a star configuration at respective first and second central passive optical couplers, a first and second parent hub, each parent hub having a unique address and said first and second parent hubs respectively connected to said first and second optical coupler, said first and second hubs also being connected together with an optical connecting means in a star configuration at a common main passive optical coupler, said method comprising:

assigning a first and second part destination address to a message to be sent, said first destination address part containing the address of the destination hub and said second destination address part containing the address of the destination station connected to said destination hub;

assigning a first and second part source address to the message to be sent, said first source address part containing the address of the parent hub and said second source address part containing the address of the source station;

transmitting said message from a source station inside the family to said parent hub and to all stations connected to said parent hub;

copying said message at said parent hub only if the message destination is a station outside of the family of the transmitting station, and then retransmitting said message outside said source family to at least one other hub;

copying said parent hub retransmitted message at a receiving hub only if the message destination is a station inside the family of stations of that hub, and then retransmitting said retransmitted message to the family of stations of said receiving hub; and copying a message by the destination station.

2. The method of communicating messages as claimed in claim 1 wherein said network stations use the CSMA/CD protocol.

3. The method of communicating messages as claimed in claim 2 and further comprising the step of transmitting a message receipt by any hub or station copying said message back to the hub or station from which that hub received the message.

4. The method of communicating messages as claimed in claim 3 and further comprising the step of checking a copied message for errors and only sending a message receipt when no errors are detected.

5. The method of communicating messages as claimed in claim 4 and further comprising the step of retransmitting a message when a receipt signal is not received.

6. The method of communicating messages as claimed in claim 1 wherein said source station transmits a message only after determining that it is not then receiving a message.

* * * * *